(12) United States Patent
Duggal et al.

(10) Patent No.: US 10,339,559 B2
(45) Date of Patent: Jul. 2, 2019

(54) ASSOCIATING SOCIAL COMMENTS WITH INDIVIDUAL ASSETS USED IN A CAMPAIGN

(71) Applicant: Adobe Inc., San Jose, CA (US)

(72) Inventors: Ashish Duggal, New Delhi (IN); Anmol Dhawan, Ghaziabad (IN); Sachin Soni, New Delhi (IN); Anuj Jain, New Delhi (IN)

(73) Assignee: Adobe Inc., San Jose, CA (US)

( * ) Notice: Subject to any disclaimer, the term of this patent is extended or adjusted under 35 U.S.C. 154(b) by 201 days.

(21) Appl. No.: 14/560,791

(22) Filed: Dec. 4, 2014

(65) Prior Publication Data

US 2016/0162930 A1    Jun. 9, 2016

(51) Int. Cl.
*G06Q 30/00* (2012.01)
*G06Q 30/02* (2012.01)
*G06Q 50/00* (2012.01)

(52) U.S. Cl.
CPC ......... *G06Q 30/0245* (2013.01); *G06Q 50/01* (2013.01)

(58) Field of Classification Search
CPC .................................................. G06Q 30/0245
See application file for complete search history.

(56) References Cited

U.S. PATENT DOCUMENTS

| | | | | |
|---|---|---|---|---|
| 8,099,316 B2* | 1/2012 | Moukas | ............. | G06Q 10/0631 705/7.29 |
| 2008/0071929 A1* | 3/2008 | Motte | ................. | G06F 17/3089 709/246 |
| 2008/0147487 A1* | 6/2008 | Hirshberg | ............... | G06Q 30/02 705/14.53 |
| 2009/0048904 A1* | 2/2009 | Newton | ............. | G06Q 30/0201 705/7.29 |
| 2009/0265332 A1* | 10/2009 | Mushtaq | ................. | G06F 17/30 |
| 2011/0213681 A1* | 9/2011 | Shahid | ................... | G06Q 30/02 705/27.1 |
| 2012/0158685 A1* | 6/2012 | White | ............... | G06F 17/30867 707/706 |
| 2012/0278064 A1* | 11/2012 | Leary | .................... | G06F 17/274 704/9 |
| 2013/0073336 A1* | 3/2013 | Heath | .................... | G06Q 30/02 705/7.29 |
| 2013/0132384 A1* | 5/2013 | Bohm | ............... | G06F 17/30283 707/736 |
| 2013/0325877 A1* | 12/2013 | Niazi | ................. | G06Q 30/0203 707/748 |
| 2014/0122222 A1* | 5/2014 | Rothman | ............... | G06Q 30/02 705/14.44 |

* cited by examiner

*Primary Examiner* — Bennett M Sigmond
*Assistant Examiner* — Scott C Anderson
(74) *Attorney, Agent, or Firm* — SMBC (57) ABSTRACT

Associating social comments with individual assets used in a campaign is described. In one or more embodiments, a campaign that includes one or more assets (e.g., images or videos of products) is published to one or more social networks. Comments (e.g., user comments, user shares, or other textual feedback) to the campaign on the one or more social networks are collected and analyzed to attribute each comment to an individual asset of the campaign. Social metadata, such as a social mention count and a social sentiment score, is generated based on the comments to enhance metadata of the individual asset.

20 Claims, 8 Drawing Sheets

| Asset ID | Asset Metadata |
|---|---|
| iPad Mini | iPad; mini; Apple |
| HP Laptop | HP, Pavilion; Laptop |
| Vizio TV | LED; TV; Vizio |
| LG TV | LED; TV; LG |

| Asset ID | Asset Metadata | Social Mention Count | Social Sentiment Score |
|---|---|---|---|
| iPad Mini | iPad; mini; Apple | 2 | 8 |
| HP Laptop | HP; Pavilion;Laptop | 1 | 9 |
| Vizio TV | LED; TV; Vizio | 2 | 2 |
| LG TV | LED; TV; LG | 0 | -- |

ASSOCIATING SOCIAL COMMENTS WITH INDIVIDUAL ASSETS USED IN A CAMPAIGN

Marketing campaigns posted to social networks (e.g., Facebook, Twitter, and Google+) may include multiple assets or images. While some conventional solutions can determine the effectiveness of the campaign as a whole, conventional solutions are unable to attribute the effectiveness of the campaign to individual assets within the campaign.

SUMMARY

Associating social comments with individual assets used in a campaign is described. In one or more embodiments, a campaign that includes one or more assets (e.g., images or videos of products) is published to one or more social networks. Comments (e.g., user comments, user shares, or other textual feedback) to the campaign on the one or more social networks are collected and analyzed to attribute each comment to an individual asset of the campaign. Social metadata, such as a social mention count and a social sentiment score, is generated based on the comments to enhance metadata of the individual asset.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Marketing campaigns often include multiple different assets, such as images or videos of products being marketed in the campaign. For example, a marketer for a technology store may create a sales pamphlet featuring a one-day sale on a particular tablet device, a particular television, and a particular laptop. The marketer can then share this pamphlet on social networks (e.g., Facebook and Twitter) to drive people to the store.

With social networks, feedback from users is received in the form of comments, likes, shares, favorites, retweets, and so forth. Marketers and businesses would like to identify how individual assets within the campaign performed. For instance, in the example above, comments may be received which mention that the particular television is horrible, or that the particular laptop is a great laptop at a great price. Conventional solutions, however, are unable to attribute these comments to a specific asset in the campaign, and thus the marketer is unable to determine the reasons why a particular campaign is either successful or unsuccessful.

Consider, for example, a campaign in the form of pamphlet advertising products being sold at Walmart that is published to social networks to drive people to a nearby Walmart to purchase items. Consider that the campaign includes the following assets: an image of an "iPad-mini by Apple®", an image of "a Pavilion Laptop by HP®", an image of an "an LED TV by Vizio®", and an image of an "LED TV by LG®". After this campaign is published, comment are received that are positive towards the iPad mini by Apple but negative to the LED TV by Vizio, such as the following comment: "I'm apple fan . . . iPad mini at wonderful price, no to Vizio LED". Conventional solutions do not enable marketers and businesses to attribute comments to individual assets within the campaign. Thus, in the past, marketers and businesses would be unable to determine that the comments were positive for Apple but negative for Vizio.

The described techniques automatically enhance the metadata of individual assets used in a campaign by identifying relevant comments and a sentiment of each comment. In one or more embodiments, each comment is analyzed using natural language processing techniques to identify keywords. These keywords are then compared to keywords associated with the individual asset to determine a similarity between the keywords of the comment and the keywords of the individual asset. Based on this comparison, each comment is attributed to an individual asset and a social mention count of the individual asset is incremented to indicate the total number of comments mentioning the individual asset. In addition, a social sentiment score indicating the relative negativity or positivity of each comment is determined and associated with the individual asset. Determining the social mention count and the social sentiment score of individual assets enables marketers and businesses to determine the most talked about assets used in a campaign, assets for which people are positive, assets for which people are negative, and so forth.

Doing so has a variety of benefits for marketers and businesses, such as identifying the assets which are bringing customers to stores so that these assets can be used in future campaigns, identifying assets which are negative so that these assets can be removed from future campaigns, and identifying assets which are infrequently mentioned so that these assets can be replaced with other assets in future campaigns.

Returning to the example above, when the comments are received, social metadata is generated that is positive for the iPad by Apple but negative towards the LED TV by Vizio. If the campaign was successful, marketers can use the social metadata to determine that the success of the campaign was likely due to the iPad mini asset because the comments were positive towards the iPad mini. Alternately, if the campaign was unsuccessful, marketers can use the social metadata to determine that the lack of success was likely due to the Vizio TV because the comments were negative towards the Vizio TV asset. Furthermore, the social metadata enables marketers to optimize future campaigns, such as by re-using the iPad mini asset in subsequent campaigns but removing the Vizio TV asset.

Example Environment

Figure 1:
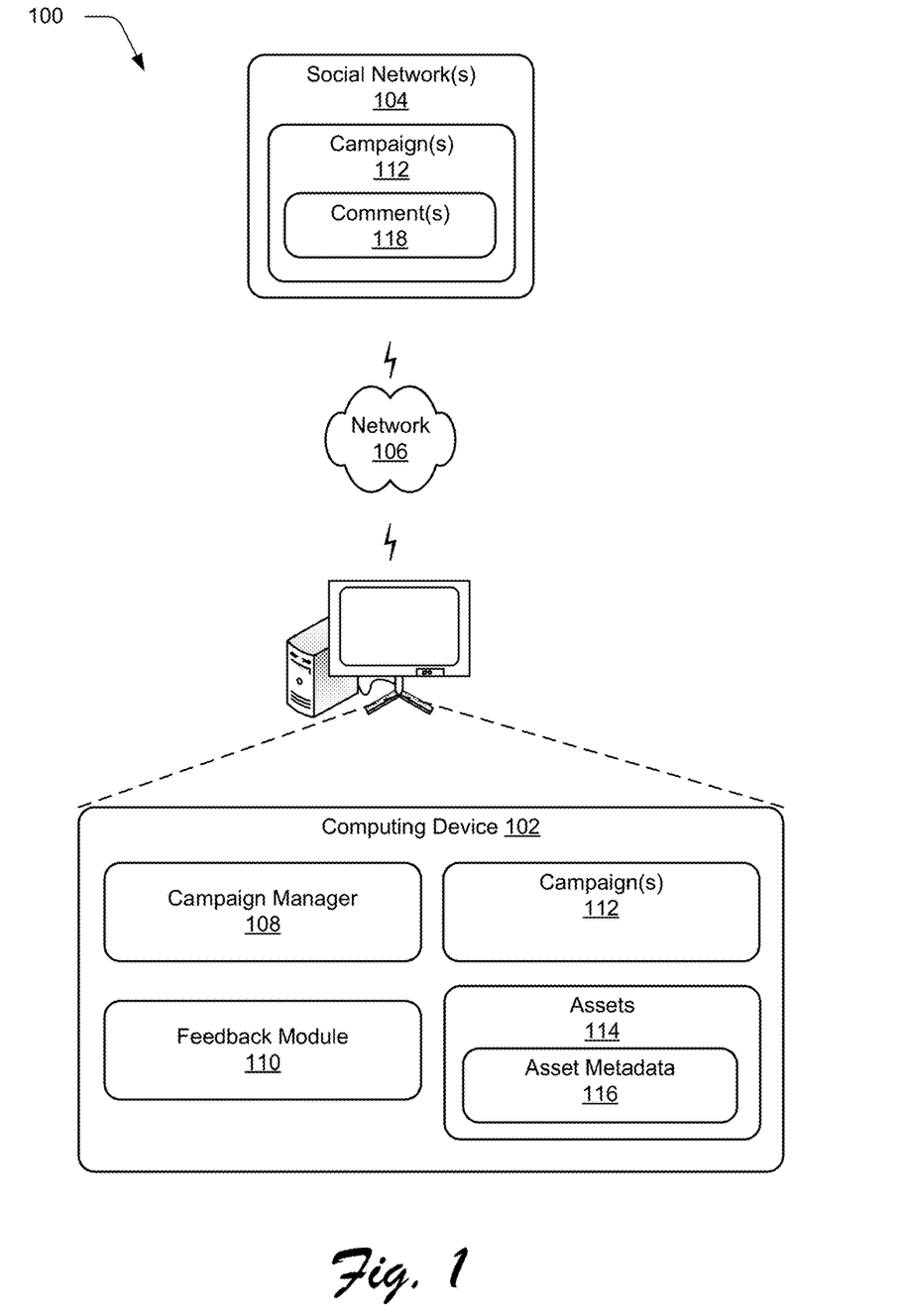
FIG. 1 illustrates an environment in an example implementation that is operable to employ techniques described herein.

FIG. 1 illustrates an environment 100 in an example implementation that is operable to employ techniques described herein. Environment 100 includes a computing device 102 and one or more social networks 104 that are communicatively coupled via a network 106. Computing device 102 and social network 104 may be configured in a variety of different ways.

Computing device 102, for instance, may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to low-resource devices with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 8.

Although network 106 is illustrated as the Internet, the network may assume a wide variety of configurations. For example, network 106 may include a wide area network (WAN), a local area network (LAN), a wireless network, a public telephone network, an intranet, and so on. Further, although a single network 106 is shown, network 106 may also be configured to include multiple networks.

Social network 104 provides an interface (not shown) for multiple users to interact with a social network community over network 106. As described herein, a social network may include blogs and online forums, social media sharing services, social networking services, and social news services.

Social media sharing services can include video services (e.g., YouTube® and Vimeo®), photo services (e.g., Flickr®, Picasa®, and Instagram®), audio services (e.g., Pandora® and LastFM®), and bookmark services (e.g., StumbleUpon® and Delicious®). Example of social networking services include Facebook®, Google+®, Twitter®, LinkedIn®, Plurk®, and Xing®. Examples of social news services include Digg® and Reddit®.

Computing device 102 is illustrated as including a campaign manager 108 and a feedback module 110. Computing device 102 is implemented by one or more of a marketer, creative professional, or business owner to create campaigns and generate social metadata from feedback to campaigns. Campaign manager 108 is representative of functionality to enable a creative entity, marketing entity, business, or brand to prepare and publish marketing campaign documents ("campaigns") 112 to social networks 104, such as Facebook, Twitter, and so forth.

As described herein, campaigns 112 include any social post, message, photo, video, or other media, published to an online forum or newsgroup, a social network platform (e.g., Facebook®, Twitter®, or Instagram®), a blog, or any other type of social network 104.

Campaign manager 108 is configured to include assets 114 (e.g., images, video, or other media) in each campaign 112. In some cases, assets 114 may correspond to products within campaign 112. For example, a social post to Facebook may advertise that three different types of televisions are going on sale in a particular electronics store that evening In this case, images of each of the three different types of televisions may be considered an asset 114. However, assets may also include other components or features of campaign 112. For example, assets 114 may correspond to a song being played in campaign 112, a celebrity being featured in campaign 112, and so forth. Each asset 114 includes asset metadata 116, which may include keywords which identify the asset.

When a campaign 112 is published to social networks 104, user devices (e.g., computing devices utilized by users that access social networks 104) can provide social comments ("comments") 118 to the campaign. As described herein, comments 118 include any type of social interaction with a campaign 112 published to a social network, such as comments, replies, shares, likes, retweets, favorites, and any other type of textual feedback to the campaign.

Feedback module 110 is representative of functionality to attribute comments 118 to individual assets 114 of the campaign 112, and to generate social data associated with each comment 118.

Further discussion of the functionality of campaign manager 108 and feedback module 110 can be found below with reference to FIGS. 2 and 4, respectively.

Figure 8:
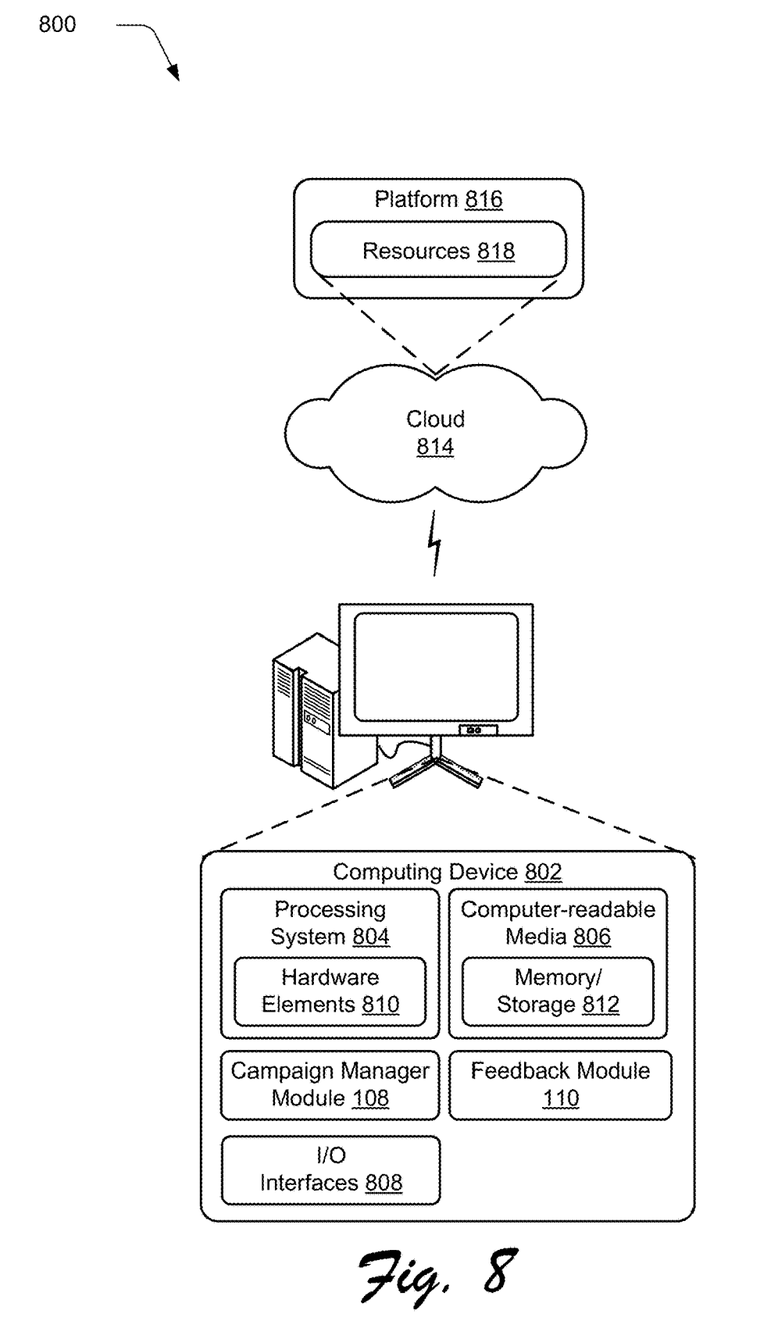
FIG. 8 illustrates an example system that includes an example computing device that is representative of one or more computing systems and/or devices that may implement the various techniques described herein.

Although illustrated as part of computing device 102, functionality represented by campaign manager 108 and feedback module 110 may be further divided, such as to be performed "over the cloud" by one or more servers that are accessible via network 106, further discussion of which may be found in relation to FIG. 8.

Campaign Manager

Figure 2:
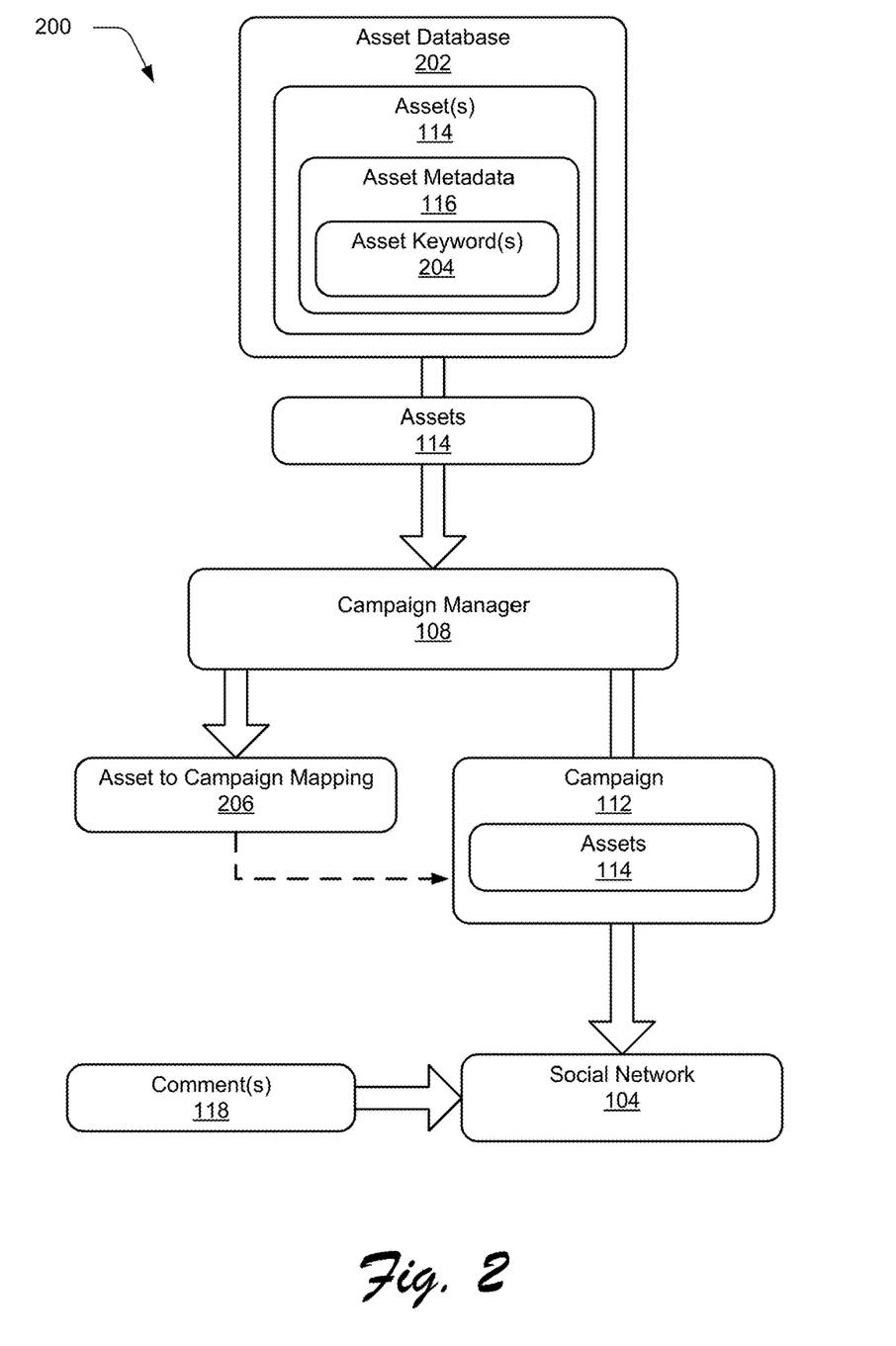
FIG. 2 illustrates a system in an example implementation in which a campaign manager generates a campaign that includes one or more assets.

FIG. 2 illustrates a system 200 in an example implementation in which campaign manager 108 generates a campaign 112 using one or more assets 114.

In example 200, individual assets 114 are stored in an asset database 202 along with asset metadata 116. Asset metadata 116 may be embedded into each asset 114, such as by using Extensible Metadata Platform (XMP) by Adobe®. Asset metadata 116 includes asset keywords 204 which identify the respective asset 114. For example, asset metadata 116 associated with an image of an "HP Pavilion Laptop" may include asset keywords 204 such as "HP", "Pavilion", and "Laptop".

Campaign manager 108 is configured to select assets 114 from asset database 202, and use the selected assets to create a campaign 112, such as by placing, linking, or embedding the assets in the campaign 112. In one or more embodiments, asset database 202 is implemented as a single asset repository (e.g., in the cloud) which enables a shared asset workflow where creative professionals create marketing campaigns which may be deployed by marketing entities across a variety of different marketing channels, such as social networks, websites, and so forth. For example, the shared asset workflow enables a marketing entity or company to select assets 114 from asset database 202 and share the assets with a creative professional. The creative professional can then create campaign 112 which includes the selected assets 114. Campaign 112 can then be received and deployed by the marketing entity on social networks 104.

Figure 3:
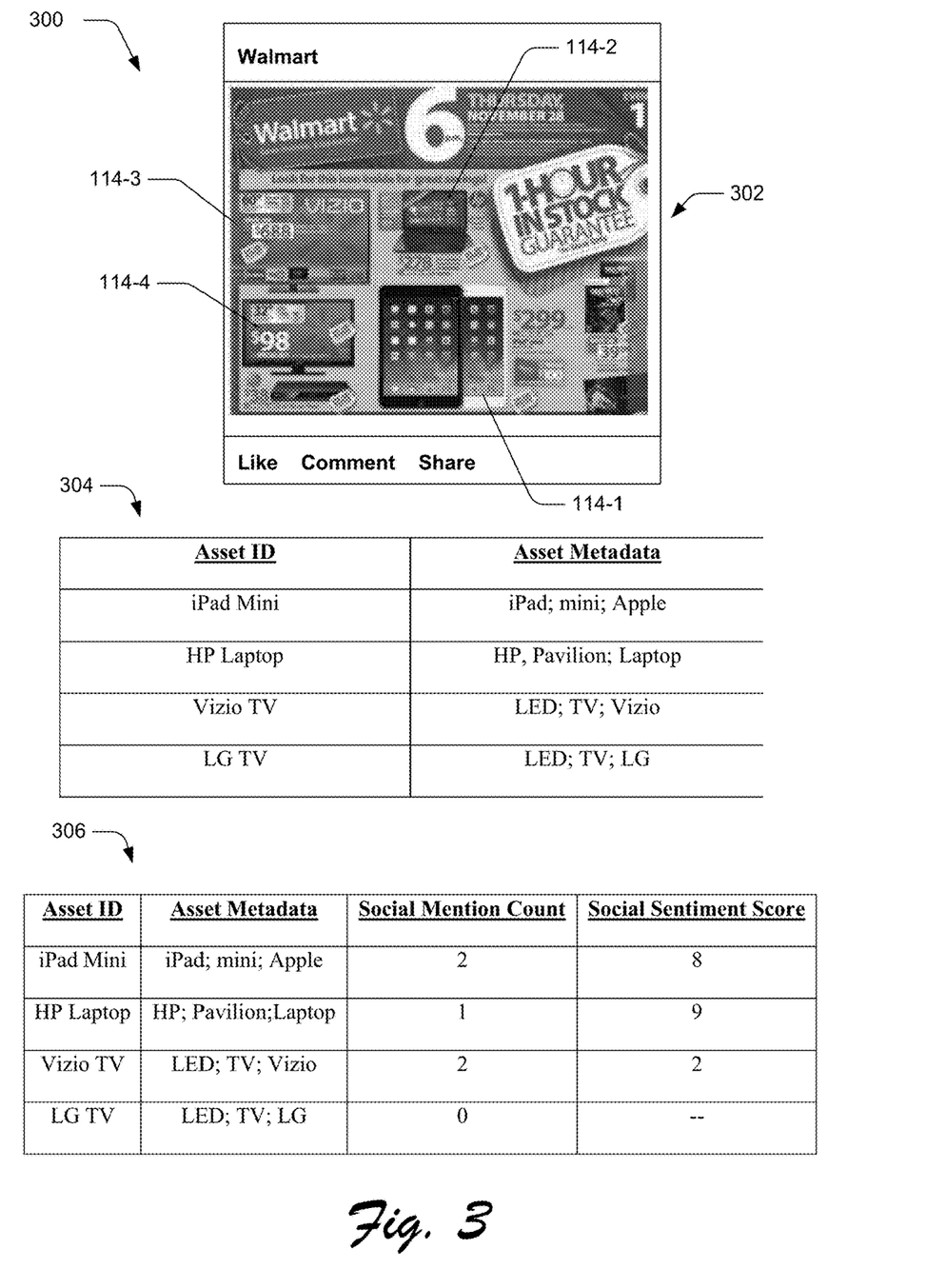
FIG. 3 illustrates an example of a campaign posted to a social network in accordance with one or more embodiments.

By way of example, consider FIG. 3 which illustrates an example 300 of a campaign posted to a social network in accordance with one or more embodiments.

In example 300, the company "Walmart" has posted a campaign 302 to their brand page on social network 104 (e.g., Facebook). It is to be noted, however, that campaign manager can post campaign 302 to other social networks as well, such as Twitter, Google+, and so forth.

Campaign 302, in this example, is a pamphlet advertising products being sold at Walmart. In the illustrated example, the pamphlet is published during the day and the purpose of posting this pamphlet to the social network is to bring people to a nearby Walmart store later this evening to purchase items.

Campaign 302 includes multiple different assets 114, including an image of an "iPad-mini by Apple®", an image of "a Pavilion Laptop by HP®", an image of an "an LED TV by Vizio®", and an image of an "LED TV by LG®", indicated at 114-1, 114-2, 114-3, and 114-4, respectively. Each of these assets may have originally been stored in asset database 202 along with asset metadata 116 describing the asset.

Returning to FIG. 2, as assets 114 are placed into campaign 112, campaign manager 108 generates an asset to campaign mapping 206 that maps the assets 114 used in campaign 112, along with the respective asset metadata 116 (e.g., asset keywords 204), to the campaign 112.

By way of example, in FIG. 3 an asset to campaign mapping 304 is created, which maps assets used in campaign 302 to the campaign, and also includes metadata associated with each asset. In this example, the iPad Mini asset includes asset metadata keywords iPad, mini, and Apple, the HP Laptop asset includes asset metadata keywords HP, Pavilion, and Laptop, the Vizio TV asset includes asset metadata keywords LED, TV, and Vizio, and the LG TV asset includes asset metadata keywords LED, TV, and LG.

When all of the assets 114 are placed into campaign 112, campaign manager 108 exports the campaign to an output format suitable for positing on social network 104, such as a PDF, JPEG, TIFF, PNG, and so forth. In some cases, campaign manager 108 embeds asset to campaign mapping 206 into campaign 112 such that campaign 112 includes the existing metadata of all the assets used in the campaign.

Next, campaign manager 108 publishes or posts campaign 112 on social network 104, such as by posting campaign 112 to social brand pages owned by the company on Facebook, Twitter, Google+, and so forth.

After campaign 112 is posted on social networks 104, user devices of the social network can provide comments 118 to the campaign as well as other type of social feedback such as likes, shares, retweets, favorites, and so forth.

Consider, for example, that the following comments may be received for campaign 302: "save your money Vizio customer service and their warranty service is horrible"; "hp pavilion dv5 is really a good laptop . . . at right price"; "I really want this iPad mini by apple"; and "I'm apple fan . . . iPad mini at wonderful price, no to Vizio LED".

Notably, comments 118 apply to individual assets 114 used in campaign 112 or may apply to one or more assets of the assets 114. However, conventional solutions do not enable marketers and businesses to attribute comments to individual assets or less than the total number of assets of the campaign.

Feedback Module

Figure 4:
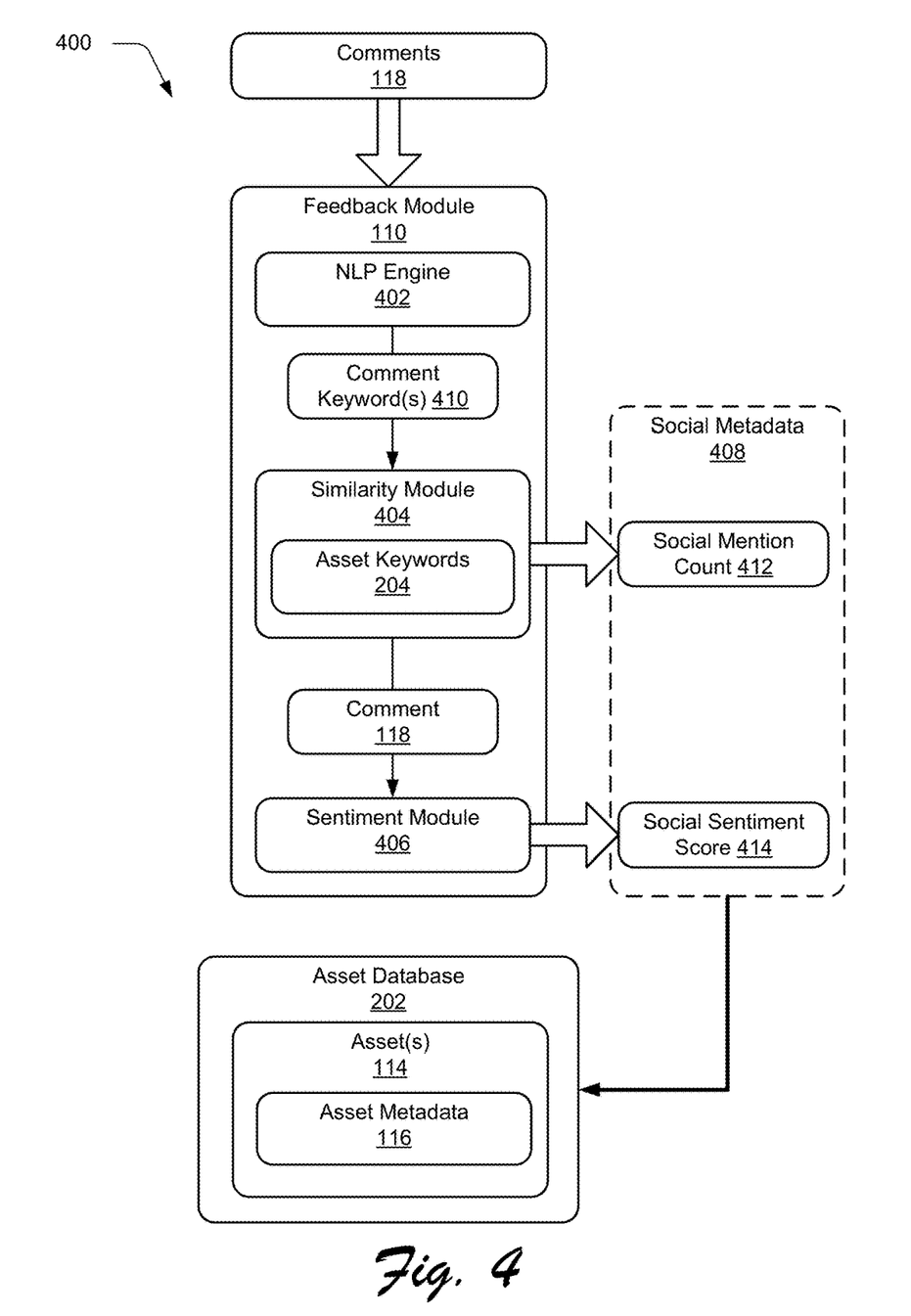
FIG. 4 illustrates a system in an example implementation in which a feedback module generates social metadata based on user comments related to a campaign in accordance with one or more embodiments.

FIG. 4 illustrates a system 400 in an example implementation in which feedback module 110 generates social metadata based on user comments related to a campaign in accordance with one or more embodiments. In example 400, feedback module 110 is illustrated as including a natural language processing (NLP) engine 402, a similarity module 404, and a sentiment module 406. Generally, feedback module 110 generates social metadata 408, based on comments 118, to enhance asset metadata 116 for each asset 114 embedded in campaign 112.

To begin, feedback module 110 automatically collects comments 118 for campaign 112. Feedback module 110 can automatically collect all of the comments 118 posted by users for campaign 112 across multiple different social networks 104. In some cases, feedback module 110 collects the comments at regular time intervals (e.g., hourly or daily).

Each comment 118 is passed to NLP engine 402. NLP engine 402 analyzes the comment 118 using natural language processing techniques to extract one or more comment keywords 410 from comment 118. NLP engine 402 can utilize an "n-gram part-of-speech (POS) tagger to identify comment keywords 410, such a statistical autotagger and summarizer or a natural language toolkit (NLTK) POS tagger ("NLTK tagger").

POS tagging enables NLP engine to determine whether each word is a noun, proper noun, verb, adjective, pronoun, article, and so forth. NLP engine 402 is configured to identify nouns, proper nouns, and verbs as comment keywords 410, such as "HP", "pavilion", "laptop", and so forth.

For example, NLP engine 402 can extract the keywords "Vizio", "service", "Customer", and "warranty" from the comment "save your money Vizio customer service and their warranty service is HORRIBLE". As another example, NLP engine 402 can extract the keywords "dv5", "hp", "pavilion", "laptop", and "price" from the comment "hp pavilion dv5 is really a good laptop . . . at right price". A more detailed discussion of NLP engine 402 may be found below in the section entitled "Example NLP engine".

Similarity module 404 receives comment keywords 410 from NLP engine 402. Similarity module 404 also accesses asset keywords 204 associated with the assets 114 used in campaign 112. To do so, similarity module 404 can access the asset to campaign mapping 206 either from asset database 202 or directly from campaign 112 (if mapping 206 is embedded within campaign 112).

For each asset 114 used in campaign 112, similarity module 404 compares the comment keywords 410 to the asset keywords 204. Based on this comparison, similarity module 404 attributes, or matches, each comment 118 to one or more of the individual assets 114 used in the campaign. To do so, similarity engine can determine a cosine similarity between comment keywords 410 and asset keywords 204. If the cosine similarity is above a predetermined threshold, then similarity module 404 attributes the comment 118 to the respective asset 114.

For example, the comment "save your money Vizio customer service and their warranty service is HORRIBLE", can be attributed to the Vizio TV asset because both the asset and the keyword contain the keyword "Vizio".

Similarity module 404 increments a social mention count 412 for the individual asset to which the comment belongs.

The social mention count 412 indicates the total number of comments 118 that can be attributed to each individual asset 114 of campaign 112.

Notably, similarity module 404 can determine that a comment 118 applies to multiple individual assets 114 in campaign 112. For example, consider the following comment "I'm apple fan . . . iPad mini at wonderful price, no to Vizio LED". Similarity module 404 can match this comment to assets corresponding to both "iPad mini" and "Vizio LED TV", as well as increment the social mention count for each of these assets.

After comment 118 is attributed to an individual asset 114 of campaign 112, comment 118 is passed to sentiment module 406, which is implemented as any type of sentiment analysis engine, such as AlchemyAPI which provides the ability to extract keyword-level sentiment (e.g., positive or negative statements) from comments 118.

Sentiment module 406 analyzes each comment 118 and generates a social sentiment score 414 for the comment that indicates whether the comment is positive or negative. For example, sentiment module 406 can generate social sentiment score 414 on a scale of 1 to 10, where 1 means most negative and 10 means most positive. Referring to the example above, sentiment module 406 may generate a sentiment score of 8 out of 10 for the comment "hp pavilion dv5 is really a good laptop . . . at right price", which indicates that the comment is positive for the HP pavilion laptop asset.

Sentiment module 406 can determine social sentiment score 414 for comments attributed to more than one asset 114. For example, for the comment "I'm apple fan . . . iPad mini at wonderful price, no to Vizio LED", sentiment module can determine that the sentiment is positive for "iPad mini", but negative for "Vizio LED".

After social sentiment score 414 is generated, the sentiment score is used to enhance the sentiment score of the respective asset. An average sentiment score for each asset is determined by dividing the total sentiment score for the asset by the mention count for the asset.

Feedback module 110 provides social metadata 408, which includes social mention count 412 and social sentiment score 414, to asset database 202 to enhance the asset metadata 116 corresponding the assets 114 in campaign 112. In one or more embodiments, for each asset, a total social mention count (the total number of mentions across multiple campaigns) and an average social mention count (an average number of mentions per campaign) is determined and stored with asset metadata 116. Additionally, an average social sentiment score for each asset 114 is determined by dividing the total social sentiment score for the asset by the total mention count for the asset. The average sentiment score may also be stored with asset metadata 116 in asset database 202.

By way of example, in FIG. 3, at 306 the asset to campaign mapping is updated to include social metadata 408 corresponding to the comments received for campaign 302. In this case, the social mention count for the iPad mini asset has been incremented to a value of "2" based on two different comments 118 mentioning the asset (e.g., "I really want this iPad mini by apple" and "I'm apple fan . . . iPad mini at wonderful price, no to Vizio LED". As these comments are both positive towards the iPad mini asset, a social sentiment score of "8" for the iPad mini asset has been added to the metadata. On a scale of 1-10 (where 1 is negative and 10 is positive), the social sentiment score of "8" indicates that the comments are positive for the iPad mini asset.

Similarly, the social mention count for the HP laptop asset has been incremented to a value of "1" based on a single comment 118 mentioning the asset (e.g., "hp pavilion dv5 is really a good laptop . . . at right price"), and a social sentiment score of 9 has been added to the metadata to reflect the positivity of this comment.

Similarly, the social mention count for the Vizio TV asset has been incremented to a value of "2" based on two comments 118 mentioning the asset (e.g., "save your money Vizio customer service and their warranty service is horrible" and "I'm apple fan . . . iPad mini at wonderful price, no to Vizio LED". However, since both these comments are relatively negative towards the Vizio TV asset, a social sentiment score of "2" has been added for the Vizio TV asset to reflect the negativity of the comments regarding the Vizio TV asset.

In this case, none of the comments mentioned the LG TV, and thus the social mention count for LG TV is "0", and there is no social sentiment score.

Notably, social metadata 408 enables marketers and businesses to identify how individual assets 114 within campaign 112 performed. For example, from the social metadata added at 306, it can be determined that the iPad mini asset performed positively because it received a high number of social mentions with positive sentiment, and that the Vizio TV asset performed negatively because it received a high number of negative comments.

In the past, marketers and businesses would be unable to determine whether individual assets were the cause of the success, or lack thereof, of a marketing campaign. Now, however, social metadata 408 enables marketers and businesses to attribute the success of the campaign to individual assets 114. In the example above, if the campaign was successful, it can be determined that this was likely due to the iPad mini asset which received a high number of positive social mentions. Alternately, if the campaign was unsuccessful, it can be determined that this is likely due to the Vizio TV asset which received a high number of negative mentions.

Furthermore, social metadata 408 enables marketers to optimize future campaigns by including positive assets in the future campaigns and removing negative assets. For example, marketers and businesses may re-use the iPad mini asset in subsequent campaigns but remove the Vizio TV asset.

In one or more embodiments, asset database 202 is configured with search functionality that enables users (e.g., creative professionals, marketers, and businesses) to search for assets 114 using their average social mention count and average social sentiment score.

Thus, social metadata 408 enables users to search for and identify assets 114 which are bringing customers to stores (e.g., by search for assets with high mention counts and high social sentiment scores). These assets can then be used and highlighted in future campaigns.

Additionally, the social metadata 408 enables users to search for and identify assets 114 for which customers are negative (e.g., by searching for assets with negative social sentiment scores). These assets can then be removed from future campaigns.

Additionally, the social metadata 408 enables users to search for and identify assets 114 which are infrequently mentioned which indicates low user interest (e.g., by search for assets with low mention counts). These assets can be replaced with other assets to create more buzz in future campaigns.

In one or more embodiments, thresholds may be set in asset database 202 such that assets 114 that fall below the threshold for either social mention count or social sentiment score can be flagged or highlighted to the user. This may enable marketers and businesses to quickly and easily determine whether or not to use an asset in a campaign. For example, a marketer may be planning to use a particular asset in a campaign, but then notice that it has been flagged as having a low social sentiment score. In this case, the marketer may decide to use a different asset.

In one or more embodiments, performance of an asset 114 is determined based on the social mention count and/or the social sentiment score. Assets that have social mention counts and/or social sentiment scores above the threshold may be categorized as "high performing" assets. Alternately or additionally, an asset with the highest social mention count and/or social sentiment score is automatically qualified as a "best performer".

Example NLP Engine

As noted above, NLP engine 402 can utilize an "n-gram POS (part of speech) tagger" to generate comment keywords 410. In some cases, NLP engine 402 uses a "Statistical Autotagger and summarizer" as the POS tagger.

Alternately, NLP engine can utilize Natural Language Toolkit (NLTK) POS tagging as the POS tagger. Below is a an example text mining approach that is used to identify the the frequency of comment keywords 410 in a comment 118 using NLTK techniques in one or more embodiments:

First, comment 118 is tokenized by NLP engine 402 using the following script: "tokens=nltk.word_tokenize(raw)".

Next, the tokenized text is converted to lower case by NLP engine 402 using the following script: "words= [w.lower( ) for w in tokens".

Next, NLP engine 402 performs stemming on the words to find stems of the words. NLP engine 402 can use a Porter or Lancaster stemmer using the following script:

```
porter = nltk.PorterStemmer( )
lancaster = nltk.LancasterStemmer( )
stemedwords_first_pass = [porter.stem(t) for t in words]
stemedwords_final_pass = [lancaster.stem(t) for t in stemedwords_first_pass]
```

Next, NLP engine 402 performs lemmatization using the following script:

```
wnl = nltk.WordNetLemmatizer( )
completely_normalized_words = [wnl.lemmatize(t) for t in stemedwords_final_pass]
```

Finally, NLP engine 402 performs POS tagging to classify the words into their parts of speech and labels each word accordingly. As noted above, after POS tagging, NLP engine 402 can determine whether each word is a noun, proper noun, verb, adjective, pronoun, article, and so forth. In order to determine comment keywords 410, NLP engine 402 identifies the Nouns, proper nouns, and verbs in comment 118. NLP engine 402 can perform the POS tagging using the following script:

pos_tagged_words=nltk.pos_tag(completely_normalized_words).

Below is a complete script that NLP engine 402 can use to identify comment keywords 410 in comments 118 in accordance with one or more embodiments:

```
import nltk
#Normalization Starts
tokens = nltk.word_tokenize(comment_text)
words = [w.lower( ) for w in tokens]
porter = nltk.PorterStemmer( )
lancaster = nltk.LancasterStemmer( )
stemedwords_first_pass = [porter.stem(t) for t in words]
stemedwords_final_pass = [lancaster.stem(t) for t in stemedwords_first_pass]
wnl = nltk.WordNetLemmatizer( )
completely_normalized_words = [wnl.lemmatize(t) for t in stemedwords_final_pass]
#Normalization Ends, Part of Speech Tagging starts
pos_tagged_words = nltk.pos_tag(completely_normalized_words)
#Extract Nouns, Proper Nouns, Verbs etc. in order of their frequency
myDict = dict( )
for key, val in sorted(pos_tagged_words):
    if((val == 'NNP' or val == 'NN' or val == 'VB') and
    len(key) > 3):
        if(myDict.has_key(key) == False):
            myDict[key] = 1
        else:
            myDict[key] = (myDict.get(key) + 1)
for word in sorted(myDict, key=myDict.get, reverse=True):
    if(myDict.get(word) > 0):
        print word + ":", myDict.get(word)
        #Print nouns,proper nouns,verbs whose occurrence is at least once
```

Example Procedures

The following discussion describes techniques for associating social comments with individual assets used in a campaign that may be implemented utilizing the previously described systems and devices. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks.

Figure 5:
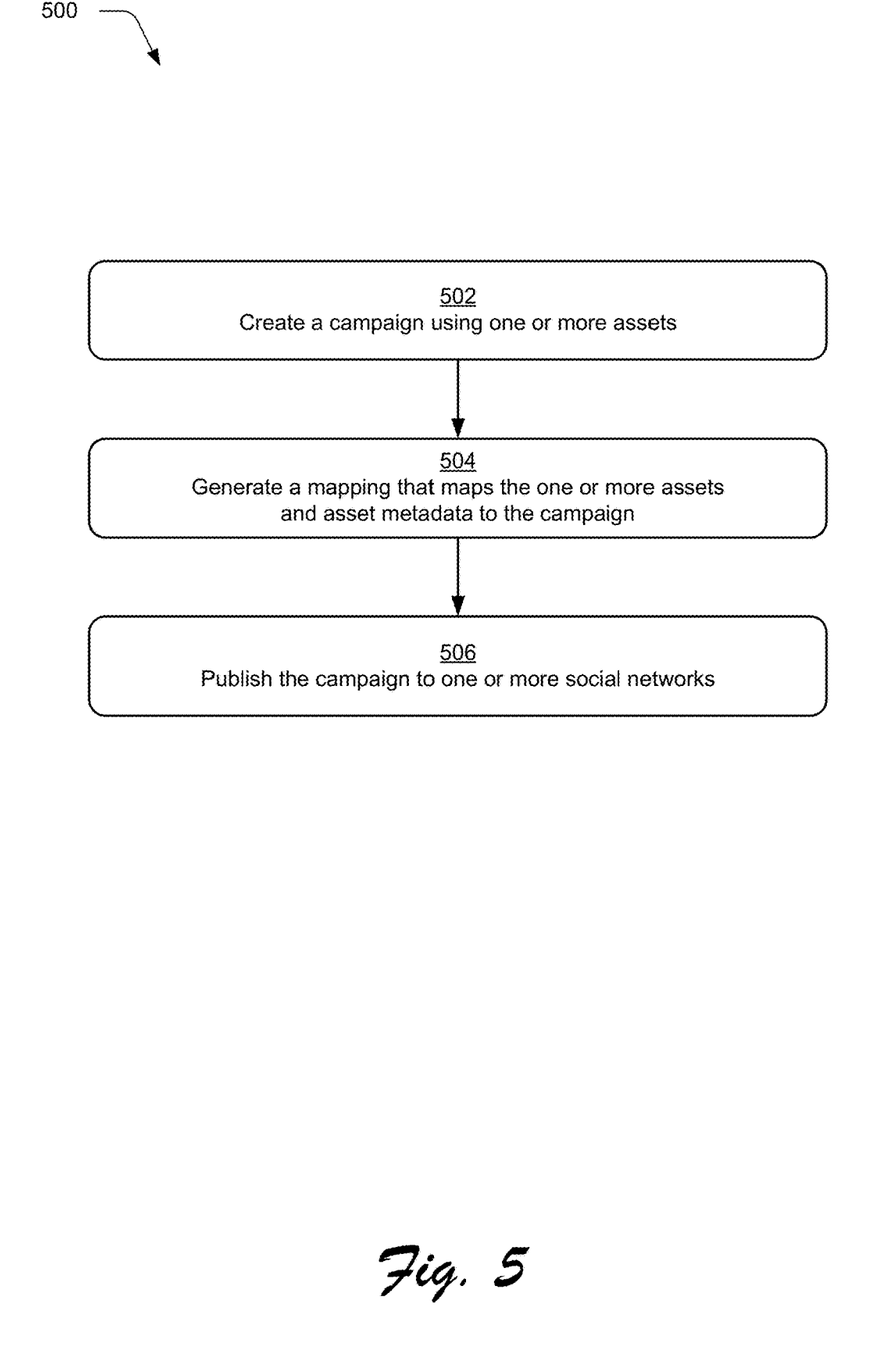
FIG. 5 illustrates a procedure in an example embodiment of generating a campaign using one or more assets.

FIG. 5 illustrates a procedure 500 in an example embodiment of generating a campaign using one or more assets.

At 502, a campaign is created using one or more assets. For example, campaign manager 108 creates a campaign 112 using one or more assets 114 stored in asset database 202.

At 504, a mapping is generated that maps the one or more assets and asset metadata to the campaign. For example, campaign manager 108 generates asset to campaign mapping 206 that maps assets 114 and asset metadata 116 to campaign 112. In some cases, campaign manager 108 embeds mapping 206 in campaign 112.

At 506, the campaign is published to one or more social networks. For example, campaign manager 108 publishes campaign 112 to one or more social networks 104.

Figure 6:
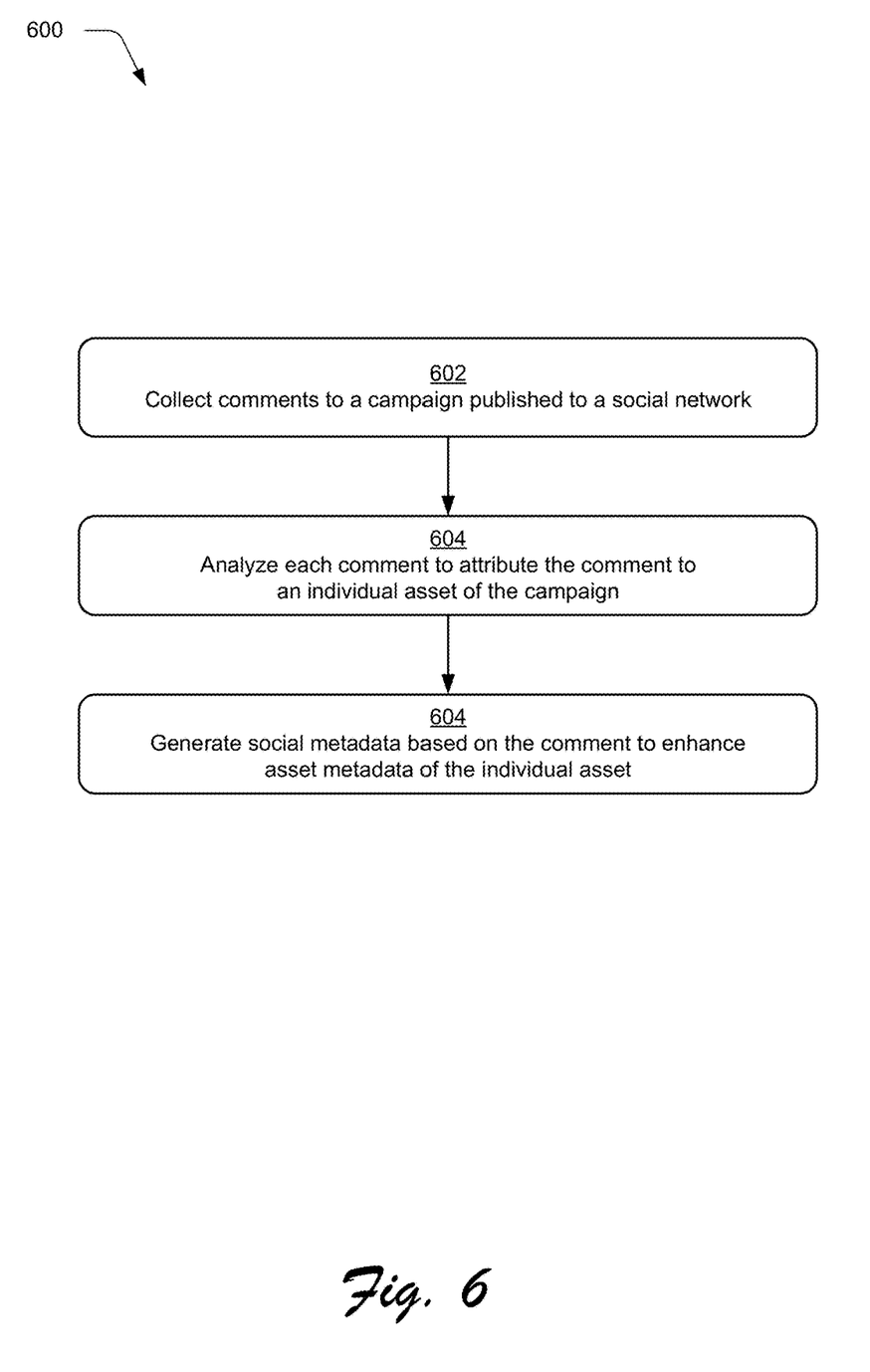
FIG. 6 illustrates a procedure in an example embodiment of generating social metadata based on comments to enhance asset metadata of individual assets.

FIG. 6 illustrates a procedure 600 in an example embodiment of generating social metadata based on comments to enhance asset metadata of individual assets.

At 602, comments to a campaign published to a social network are collected. For example, feedback module 110 collects comments 118 to campaign 112 published to social network 104.

At 604, each comment is analyzed to attribute the comment to an individual asset of the campaign. For example, feedback module 110 analyzes comments 118 to attribute each comment 118 to an individual asset 114 of campaign 112.

At 606, social metadata is generated based on the comment to enhance asset metadata of the individual asset. For example, feedback module 110 generates social metadata 408 to enhance asset metadata 116 of the individual asset 114. Social metadata 408 can include social mention count 412 and/or social sentiment score 414.

Figure 7:
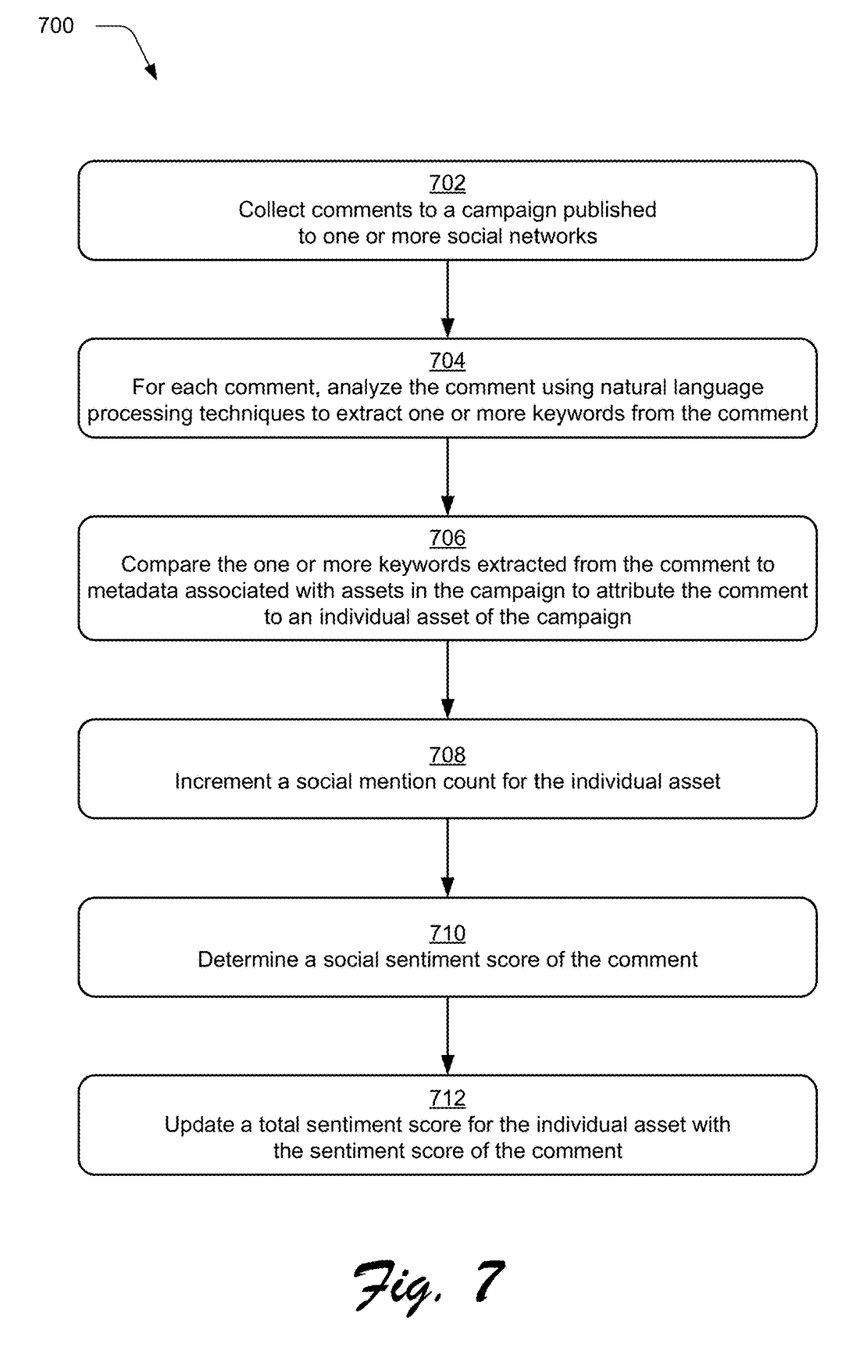
FIG. 7 illustrates a procedure in an example embodiment for determining a social mention count and a sentiment score for an asset.

FIG. 7 illustrates a procedure 700 in an example embodiment for determining a social mention count and a sentiment score for an asset.

At 702, comments to a campaign published to one or more social networks are collected. For example, feedback module 110 collects comments 118 to campaign 112 published to one or more social network 104s.

At 704, for each comment, the comment is analyzed using natural language processing techniques to extract one or more keywords from the comment. For example, NLP engine 402 analyzes each comment 118 using natural language processing techniques to extract one or more comment keywords 410 from the comment.

At 706, the one or more keywords extracted from the comment are compared to metadata associated with assets in the campaign to attribute the comment to an individual asset of the campaign. For example, similarity module 404 compares the one or more keywords extracted from the comment to asset metadata 116 (e.g., asset keywords 204) associated with assets 114 in campaign 112 to attribute comment 118 to an individual asset 114.

At 708, a social mention count for the individual asset is incremented. For example, similarity module 404 increments social mention count 412 for the individual asset 114.

At 710, a social sentiment score for the comment is determined, and at 712 a total social sentiment score for the individual asset is updated with the social sentiment score of the comment. For example, sentiment module 406 determines a social sentiment score 414 of the comment 118, and updates the total social sentiment score for the individual asset 114 with the social sentiment score 414 of the comment 118.

Example System and Device

FIG. 8 illustrates an example system generally at 800 that includes an example computing device 802 that is representative of one or more computing systems and/or devices that may implement the various techniques described herein. This is illustrated through inclusion of campaign manager 108 and feedback module 110 which may be configured to implement the associating social comments with individual assets used in a campaign techniques as previously described.

The computing device 802 may be, for example, a server of a service provider, a device associated with a client (e.g., a client device), an on-chip system, and/or any other suitable computing device or computing system. The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may comprise semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
   at least one processor; and
   a computer-readable storage medium storing instructions that are executable by the at least one processor to perform operations comprising:
      collecting a comment to a campaign, the campaign including a plurality of different assets and including embedded metadata associated with each of the plurality of different assets;
      analyzing the comment to extract a keyword from the comment;
      comparing the extracted keyword to the embedded metadata associated with each of the plurality of different assets;
      attributing the comment to one of the plurality of different assets based on the comparison;
      generating social metadata for the one of the plurality of different assets, based on the content of the comment; and
      embedding the generated social metadata in the one of the plurality of different assets and outputting the asset with the embedded social metadata to an asset database.

2. The system as recited in claim 1, the operations further comprising:
   determining a social sentiment score of the comment; and
   determining a total social sentiment score for the one of the plurality of different assets based on the social sentiment score of the comment, the generated social metadata describing the total social sentiment score.

3. The system as recited in claim 2, the operations further comprising:
   determining a social mention count for the one of the plurality of different assets based on a number of comments submitted to the campaign; and
   determining an average social sentiment score for the one of the plurality of different assets based on a ratio between the social mention count and the total sentiment score.

4. The system as recited in claim 3, wherein the social metadata for the one of the plurality of different assets includes the average social sentiment score for the one of the plurality of different assets.

5. The system as recited in claim 4, wherein the asset database is searchable based on average sentiment score or total social sentiment score.

6. The system as recited in claim 2, further comprising determining a performance of the one of the plurality of different assets based on at least one of the social mention count and the social sentiment score.

7. The system as recited in claim 1, wherein the comparing further comprises:
   determining a cosine similarity between the extracted keyword and keywords associated with the plurality of different assets; and,
   attributing the comment to the one of the plurality of different assets is urther in response to the cosine similarity satisfying a threshold.

8. A computer-implemented method comprising:
   storing, by a computing device and for each of a plurality of different assets in an asset database, an asset identifier and metadata associated with the asset;
   creating, by the computing device, a campaign that includes at least two of the plurality of different assets;
   embedding, by the computing device, metadata associated with the at least two different assets into the campaign;
   publishing, by the computing device, the campaign with the embedded metadata on at least one social network;
   collecting, by the computing device, a comment to the campaign submitted via the at least one social network;
   analyzing, by the computing device, the collected comment to identify at least one keyword in the comment;
   attributing, by the computing device, the collected comment to one of the at least two different assets included in the campaign based on a detected similarity between the at least one identified keyword in the comment and asset metadata embedded in the campaign;
   generating, by the computing device, social metadata for the asset to which the comment is attributed, based on content of the comment; and
   embedding, by the computing device, the generated social metadata in the metadata of the attributed asset in the asset database.

9. The computer-implemented method as recited in claim 8, wherein the social metadata describes a social mention count of the asset to which the comment is attributed.

10. The computer-implemented method as recited in claim 8, wherein analyzing the collected comment is performed using a natural language processing technique to extract the keyword.

11. The computer-implemented method as recited in claim 8, wherein attributing the collected comment to one of the at least two different assets is further based on:
   determining a cosine similarity between the at least one keyword in the comment and keywords associated with the plurality of different assets; and
   determining that the cosine similarity satisfies a threshold.

12. The computer-implemented method as recited in claim 8, wherein the social metadata describes a social sentiment score of the collected comment on a scale of negative to positive sentiment.

13. The computer-implemented method as recited in claim 8, wherein the asset database is searchable based on the social metadata.

14. A computer-implemented method comprising:
   storing, by a computing device, for each asset in an asset database, an asset identifier and metadata associated with the asset identifier;
   collecting, by the computing device, a comment to a campaign, the campaign including a plurality of different assets and including embedded metadata associated with the plurality of different assets;
   analyzing, by the computing device, the comment using natural language processing to extract a keyword from the comment;
   comparing, by the computing device, the extracted keyword to the embedded metadata associated with the plurality of different assets in the campaign;
   attributing, by the computing device, the comment to one of the plurality of different assets based on the comparison;
   determining, by the computing device, a social mention count for the one of the plurality of different assets, the social mention count indicating a total number of comments to the campaign that mention the one of the plurality of different assets;
   determining, by the computing device, a social sentiment score of the comment;
   generating, by the computing device, social metadata for the one of the plurality of different assets that describes the social mention count and the social sentiment score; and
   embedding the generated social metadata into the asset database metadata associated with the one of the plurality of different assets.

15. The computer-implemented method as recited in claim 14, wherein the comparing further comprises:
   determining, by the computing device, a cosine similarity between the extracted keyword and keywords associated with the plurality of different assets, wherein attributing the comment to the one of the plurality of different assets is further based on the cosine similarity satisfying a threshold.

16. The computer-implemented method as recited in claim 14, further comprising determining, by the computing device, a performance of the one of the plurality of different assets based on the social mention count and the social sentiment score.

17. The computer-implemented method as recited in claim 14, further comprising determining, by the computing device, an average social sentiment score for the one of the plurality of different assets based on a ratio of the total social sentiment score to the social mention count.

18. The computer-implemented method as recited in claim 17, wherein the asset database is searchable based on the average social sentiment score.

19. The computer-implemented method as recited in claim 14, wherein the social sentiment score describes a sentiment towards the comment on a scale of negative sentiment to positive sentiment.

20. The computer-implemented method as recited in claim 14, further comprising generating, by the computing device, a second campaign that includes one of the plurality of different assets based on the social metadata.

* * * * *

UNITED STATES PATENT AND TRADEMARK OFFICE
CERTIFICATE OF CORRECTION

PATENT NO. : 10,339,559 B2
APPLICATION NO. : 14/560791
DATED : July 2, 2019
INVENTOR(S) : Ashish Duggal et al.

Page 1 of 1

It is certified that error appears in the above-identified patent and that said Letters Patent is hereby corrected as shown below:

In the Claims

Column 15, Line 17, Claim 7 after "and", delete ",", therefor.

Column 15, Line 19, Claim 7 after "assets", delete "is urther", therefor.

Signed and Sealed this
Tenth Day of September, 2019

Andrei Iancu
*Director of the United States Patent and Trademark Office*